Sept. 5, 1967 R. E. GRAF ET AL 3,339,318
METHOD OF MAKING OPHTHALMIC LENS
Original Filed June 7, 1961 3 Sheets-Sheet 1

INVENTORS
ROBERT E. GRAF
ROBERT W. YOUNG
BY
ATTORNEYS

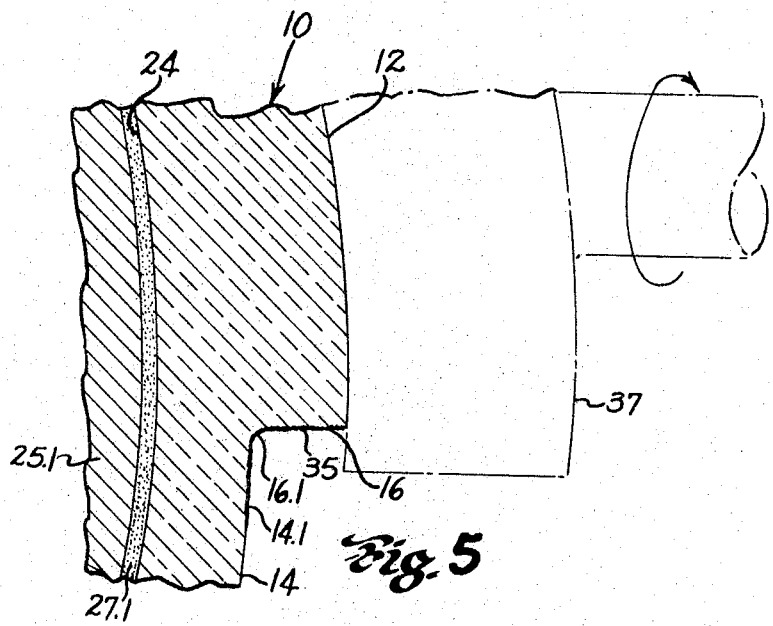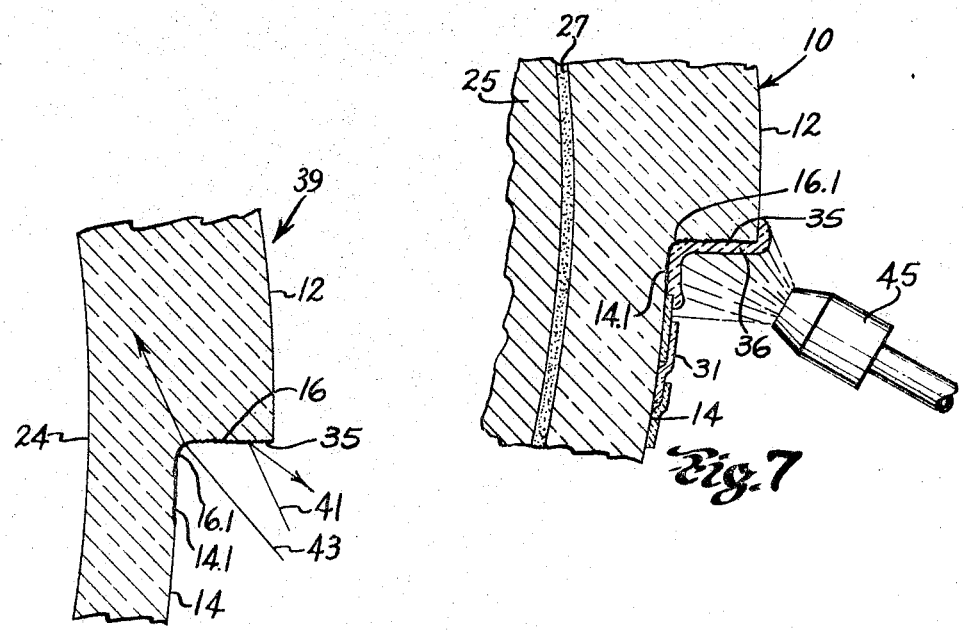

INVENTORS
ROBERT E. GRAF
BY ROBERT W. YOUNG
ATTORNEYS

United States Patent Office 3,339,318
Patented Sept. 5, 1967

3,339,318
METHOD OF MAKING OPHTHALMIC LENS
Robert E. Graf, Southbridge, Mass., and Robert W. Young, Woodstock, Conn., assignors to American Optical Company, Southbridge, Mass., a voluntary association of Massachusetts
Original application June 7, 1961, Ser. No. 115,487. Divided and this application Dec. 7, 1964, Ser. No. 425,985
5 Claims. (Cl. 51—284)

ABSTRACT OF THE DISCLOSURE

A method of treating shoulder surfaces between distance viewing and near viewing fields of one piece multifocal lenses to direct at least the major portion of light striking the shoulder surfaces away from a wearer's eyes.

This application is a division of applicants' copending application Ser. No. 115,487 filed June 7, 1961, now abandoned.

The field of this invention is that of multifocal ophthalmic lenses, and the invention relates, more particularly, to novel and improved, one-piece, multifocal lens units and to novel and improved methods of making the same.

It is an object of this invention to provide novel and improved method of making one-piece multifocal lenses including both bifocal lenses and trifocal lenses having lens surface portions of different surface curvature defining focal fields of different optical power and having steps or shoulders separating said surface portions treated so as to substantially reduce direct transmission of light therethrough.

Other objects, advantages and details of the method of lens manufacture provided by this invention appear in the following detailed description of preferred embodiments thereof, the detailed description referring to the drawings in which:

FIG. 5 is a partial section view similar to FIG. 3 illustrating a subsequent step in said method of lens manufacture;

FIG. 6 is a partial section view similar to FIG. 3 illustrating one embodiment of the multifocal lens unit provided by this invention;

FIG. 7 is a partial section view similar to FIG. 4 illustrating an intermediate step in a method provided by this invention for manufacturing another embodiment of the multifocal lens unit of this invention;

Figure 1:
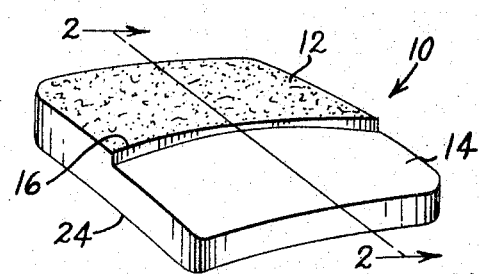
FIG. 1 is a perspective view of a one-piece multifocal lens blank of the type with which this invention is concerned.
Figure 2:
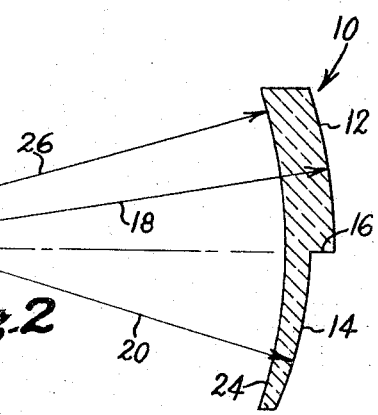
FIG. 2 is a section view along lines 2—2 of FIG. 1.

Referring to the drawings, 10 in FIG. 1 illustrates a one-piece bifocal lens blank of a type well known in the ophthalmic art, the blank being formed of ophthalmic crown glass or other transparent lens material in conventional manner. One side of a lens blank of this type is provided with two surface portions 12 and 14 of different surface curvature and the surface portions are separated by a step or shoulder 16 which preferably but not necessarily extends transversely across the blank in a substantially straight line as shown. In a typical one-piece multifocal lens blank, for example, the lens surface portion 12 can be provided with a spherical surface curvature of relatively long radius 18 and the surface portion 14 of the blank can have a spherical surface curvature of relatively short radius 20, the centers of curvature of said lens surface portions preferably lying along a common axis 22 for establishing the optical centers of the respective focal fields of the ultimate lens, which in the present instance will be in monaxial relation. The plane of the shoulder 16 also preferably intersects the optical centers of the focal fields and extends parallel to the axis 22 as shown in FIG. 2. The step or shoulder preferably has a minimum height at the center of the blank sufficient to provide a ledge or step between the surface portions 12 and 14, and the height of the shoulder increases at the edges of the blank to an extent determined by the difference in curvature of said surface portions.

In a lens blank of this type, the lens surface portion 12 can define an upper or distance focal field and the surface portion 14 can define a lower or reading focal field, each of said surfaces displaying a selected surface power. The lens blank surface 24 can then be provided with an optical finish and with a surface curvature of selected radius 26 complementary to the curvatures of the surface portions 12 and 14 for establishing the optical powers of the distance and reading fields in accordance with the prescriptive requirements of a person to be fitted with said lens. Where the lens shoulder extends in a straight line across the convex surface of the lens, the distance and reading fields of the lens will each have substantial width, but it should be understood that any other lens having a step or shoulder separating surface portions of different surface power are within the scope of this invention.

According to this invention, the lens blank 10 is provided in partially finished form with the lens surface portion 12 of relatively larger radius of curvature roughground down to the approximate surface curvature to be formed thereon as illustrated. The lens surface portion 14, however, is optically finished and polished to the precise curvature desired, and the step or shoulder 16 is formed in the desired plane for separating said lens surface portions. A lens blank can be partially finished in this manner by any conventional means but is preferably formed in the manner disclosed in U. S. Patent No. 2,966,767 which issued to John H. Kress on Jan. 3, 1961.

Figure 3:
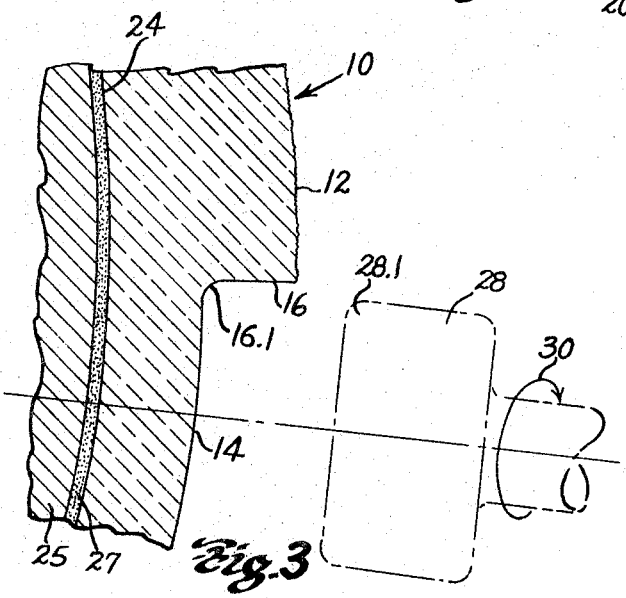
FIG. 3 is a partial section view to enlarged scale similar to FIG. 2.

It will be noted that, where the plane of the step or shoulder 16 passes through the optical center of the lens blank parallel to the axis 22 as shown in FIG. 2, the plane of the shoulder will be disposed generally edgewise to the line of sight of a person fitted with the lens so that the shoulder will appear infinitely thin and will not tend to block or interfere with any part of the wearer's field of view. However, any conventional means employed for optically finishing the lens surface portion 14 and for forming the shoulder 16 will tend to form a small fillet 16.1 of finite width at the junction of the base of the shoulder 16 and the surface portion 14. For example, where the blank 10 is mounted upon a lens block 25 by means of pitch 27 or the like and where an abrading tool 28 is adapted to rotate in the direction of the arrow 30 as shown in FIG. 3 for finishing the lens surface 14 and for forming the shoulder 16, the tool will generally have at least a small radius or chamfer 28.1, or will rapidly wear to form such a radius, so that the tool will not be adapted to remove the fillet 16.1 at the junction of the shoulder and the surface 14. Further, where the radius 28.1 on the shoulder-forming tool is very small, as will be preferred, the radius will rapidly wear to increase its size so that the fillet 16.1 formed by the tool upon a series of lenses will tend to vary to a certain extent. As will be understood, even though the fillet 16.1 is very small, the fillet will block or interfere with the field of vision of a person wearing the lens at least to a limited extent and, further, light reflected from the shoulder 16 as well as the fillet 16.1 will tend to distract the wearer's vision.

Figure 4:
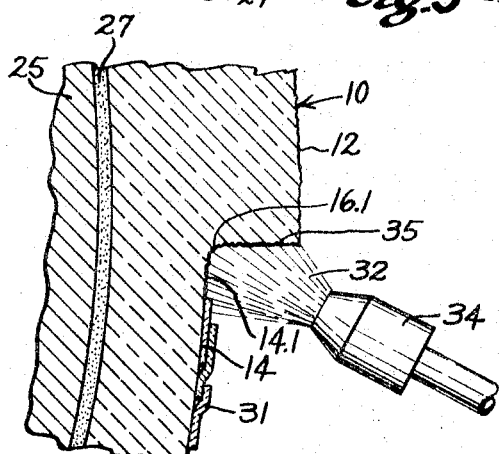
FIG. 4 is a partial section view similar to FIG. 3 illustrating a step in the method of lens manufacture provided by this invention.

According to this invention, the surface of the shoulder 16 and the shoulder fillet 16.1 and preferably a narrow strip of the surface 14 adjacent the base of the shoulder 16 are treated for substantially reducing the direct transmission of light therethrough. For example, the optically finished surface portion 14 can be masked by any conventional means so that substantially all of said surface portion is provided with a protective shield. The masking means can comprise tape 31 which can be disposed upon the surface 14 in overlapping relation as shown in FIG. 4, but, if desired, any other masking means such as shellac or a conventional strippable coating or the like can be applied to the surface 14 for protecting its optical finish. Further, if desired, the lens blank 10 can be disposed in a jig or the like having means adapted to cover the portion of the blank to be masked as will be understood. In any event, the masking means 31 should be arranged so that the shoulder 16 and preferably a narrow strip 14.1 of the surface 14 adjacent the base of the shoulder 16 are exposed to view. The strip 14.1 can be of a selected width within a limited range but is preferably at least wide enough to assure that the entire fillet 16.1 is exposed to view. On the other hand, the strip 14.1 should be kept very narrow for a reason which will be more fully explained below.

A fine abrasive material 32 can then be directed upon the shoulder or step 16, and preferably also upon an exposed strip 14.1 of the surface 14, at relatively high pressure for providing said surface areas with a uniformly textured layer or finish 35 thereon. For example, a fine corundum abrasive ($Al_2O_3$) of a particle size of approximately 27 microns can be blown from the nozzle 34 against said surface areas for providing said areas with a textured surface layer 35 similar to that provided upon a very finely ground glass viewing screen. The particles of abrasive may be blasted against the described surface areas in eiither wet or dry form as desired. As will be understood, the tape or other masking means 31 will protect the optically finished portions of the surface 14 which are masked by said means, and the surface portion 12 of the lens blank, which has thus far been finished only to a rough ground state, will not be adversely affected by action of the abrasive material. Thereafter, the abraded strip of the surface 14 and the surface of the shoulder 16 can be cleaned in any conventional manner. For example, the abraded surfaces can be blown clean with compressed air and can be brushed for removing partially-loosened particles of the lens material.

If desired, the uniformly textured layer 35 provided upon the shoulder 16, and preferably also upon the narrow strip 14.1 of the lens surface portion 14, can form the final finish layer provided thereon. For example, after abrasion of the surface of the shoulder 16 and the strip 14.1, the tape or other masking means 31 can be removed from the lens surface portion 14 and the surface 14 can be cleaned. The lens surface portion 12 of the blank can then be optically finished in a conventional manner. For example, the blank 10 can be remounted upon a larger block 25.1 with pitch 27.1 in the manner shown in FIG. 5 and the surface 12 can be ground to its final surface curvature and can be polished with a rotating tool 37 in the manner described in the previously noted U.S. patent.

The multifocal lens unit 39 provided by the above-described process is shown in FIG. 6. As illustrated, the shoulder 16 of the lens unit will have a layer 35 thereon similar to that found upon the surface of a ground glass viewing screen, the textured layer 35 preferably extending over a narrow strip 14.1 of the reading portion of the lens unit. In this construction, the surface areas treated as above described are adapted to substantially reduce the direct transmission of light therethrough and are adapted to avoid formation of a coherent and distinguishable band of light reflected from the shoulder 16 or the shoulder fillet 16.1. That is, as shown in FIG. 6, light rays such as the rays 41 and 43 which are incident upon the shoulder 16 and the shoulder fillet 16.1 and which, in a conventional one-piece multifocal lens, would tend to be uniformly reflected from the shoulder and fillet to form a coherent band of reflected light, will be diffusely reflected and refracted or scattered at the surface layer 35. Thus some of this light will be reflected away from the eye of a person fitted with the lens unit as indicated in FIG. 6 by the light ray 41, whereas other light reflected or refracted toward the eye from the layer 35 will be so diffused and scattered as to prevent distraction of the vision of a person fitted with the lens unit.

In a preferred embodiment of this invention, the lens blank 10 is processed in the manner described above with reference to FIGS. 1–4. Then with the tape or other masking means 31 remaining in shielding relation to the lens surface portion 14, a thin coating or layer of light-absorbing material 36 can be applied to the shoulder 16 and preferably to the narrow strip 14.1 of the lens blank as shown in FIG. 7. The light-absorbing material 36 can be applied either by spraying, as is preferred, or by painting or by other conventional techniques, the uniform texture of the ground surface layer 35 tending to accept a coating of light-absorbing material of uniform thickness. For example, the light-absorbing material 36 can be sprayed from a nozzle 45, as shown in FIG. 7 for applying a coating 36 which may extend partially over the masking means 31 and partially onto the lens surface portion 12.

The light-absorbing material 36 which is applied to the abraded surface areas of the lens blank 10 can be any one of a great many well-known materials which are adapted for this purpose. For example, the light-absorbing material can comprise any of the light-absorbing solder-like glasses which can be applied to the abraded blank areas in a molten state. Alternatively, the light-absorbing material can comprise one of various noble metals which can be deposited upon the abraded blank areas by any conventional technique. For example, a noble metal carried in dispersion in an organic medium can be sprayed onto the abraded blank areas and can be subsequently heated for burning off the organic medium and for leaving a coating of the metal deposited on said blank surface areas. A preferred light-absorbing material which can be employed for the puropses of this invention comprises one of the vitreous enamels or lusters such as those which are manufactured by the Hanovia Chemical Company of East Newark, N.J. For example, the vitreous enamel commercially known as Ruby Lustre No. 7828 can be sprayed from the nozzle 45 onto the abraded blank surfaces previously described and can be allowed to dry. Preferably several coats of the luster can be applied to provide a relatively dark coating which is adapted for approximately 95 percent absorption of light incident thereon.

Figure 8:
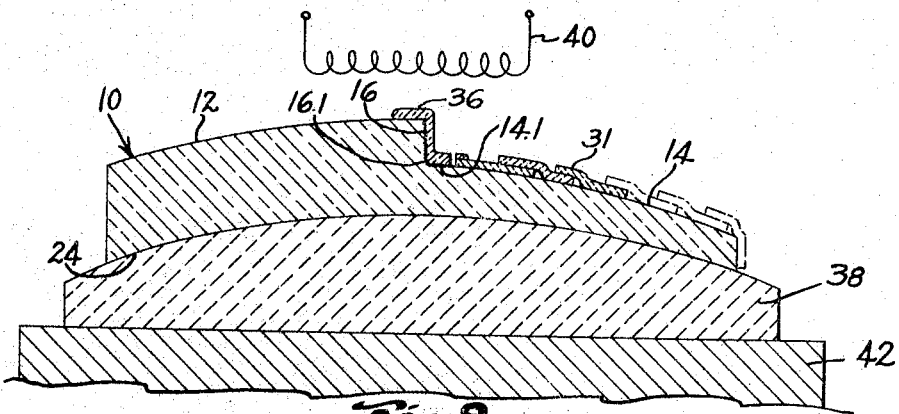
FIG. 8 is a section view similar to FIG. 7 illustrating a subsequent step in the method of FIG. 7.

When the light-absorbing luster 36 has dried, the tape 31 or other masking means can be removed as shown in FIG. 8, and the optically finished surface 14 is preferably cleaned. The lens blank 10 can then be disposed upon a ceramic block 38 or other suitable support and can be placed in a furnace of any suitable type such as is diagrammatically indicated by the heating coil 40 and the support 42 for firing the coating 36 where required. Where the Ruby Lustre of the type above described is utilized, for example, the luster can be fired at a temperature between 850° F. and 1050° F. for fusing the luster to the lens material. However, where the lens blank 10 is formed of an ophthalmic crown glass having a strain point of approximately 960° F. for example, the luster is preferably fired at a temperature of approximately 950° F. for a period of approximately 5 minutes to avoid establishment of stresses and distortions in the blank. On the other hand, if the selected light-absorbing material is to be fired at a temperature above the strain point of whatever material is embodied in the lens blank 10, the lens blank can be thereafter annealed in conventional manner. For example, where the noted ophthalmic crown embodied in the blank 10 has an annealing temperature of about 1030° F. and where the light-absorbing material 36 is fired at a temperature of 1050° F., the lens blank can be annealed by slowly cooling the blank through an annealing cycle from the temperature 1030° F. to a temperature of 960° F. in well known manner.

Figure 9:
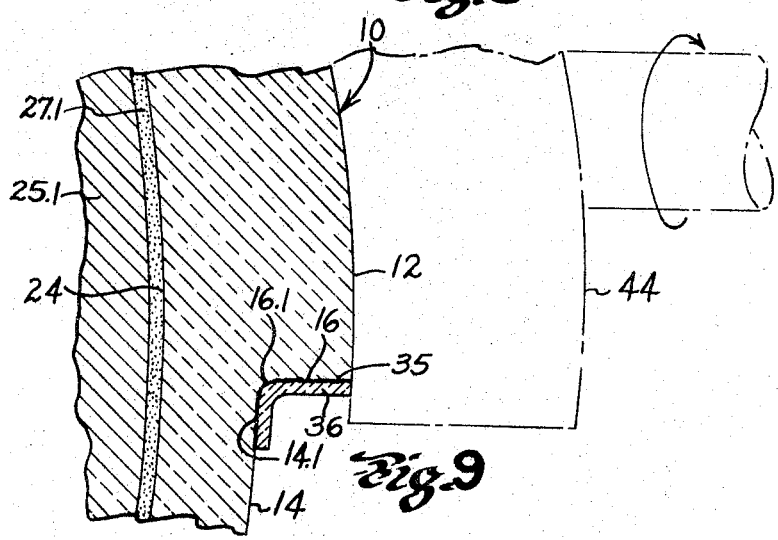
FIG. 9 is a partial section view similar to FIG. 5 illustrating a further subsequent step in the manufacture of said other embodiment of the lens unit of this invention.

After the light-absorbing material 36 has been fused or otherwise securely adhered to the lens blank 10, the lens surface portion 12 of the blank can be optically finished in conventional manner. For example, the blank can be mounted upon the larger lens block 25.1 with pitch 27.1 as shown in FIG. 9 and can be abraded and polished by a rotating tool 44 in the manner described in the previously noted U.S. patent. In the process of optically finishing the lens surface portion 12 by conventional techniques, any of the light-absorbing material 36 which may have been applied to that surface will be removed as will be understood.

Figure 10:
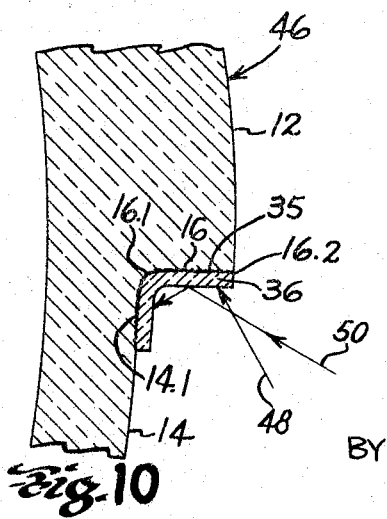
FIG. 10 is a partial section view similar to FIG. 6 illustrating said other embodiment of the lens unit provided by this invention.

The multifocal lens unit 46 provided by the above-described process is shown in FIG. 10. As illustrated, the shoulder 16 of the lens unit will have a coating of light-absorbing material thereon, the coating extending down over a narrow strip of the lens surface portion 14 to an extent sufficient to cover at least the shoulder fillet 16.1. In this construction, light rays such as the ray 48 which would tend to be incident upon and reflected from the shoulder 16 into the eye of a person fitted with the lens unit will be substantially completely absorbed by the coating 36 as shown in FIG. 10. Even light rays such as the ray 50 which impinge upon the coating 36 at grazing incidence and which are therefore at least partly reflected from the coating will tend to be intercepted and absorbed by that part of the coating 36 which extends down over the surface 14.

It has been noted previously that the occurrence of a fillet 16.1 at the junction of the shoulder 16 and the lens surface 14 is, as a practical matter, unavoidable in manufacture of a lens of the type and that such a fillet will tend to provide a degree of distortion in that part of a field of vision viewed through the fillet. However, where the fillet is coated with a light-absorbing material in the manner above-described and where the coating 36 does not extend very far below the fillet onto the lens surface 14, no distorted light rays can be transmitted through the fillet to distract the vision of a person fitted with the lens unit 46, and yet the field of clear vision obtained with the lens unit will not be significantly smaller than that which can be obtained with conventional one-piece multifocal lenses.

Further, it can be seen that the shoulder 16 cannot be completely concealed from view in a one-piece lens of this type, and it will be understood that the junction of the shoulder 16 with the lens surface portion 12 as at 16.2 will be subject to flaking or chipping and will appear quite fragile. However, where the coating 36 applied to the shoulder 16 comprises a Ruby Lustre or the like as previously suggested, the shoulder can form a pleasing line across the lens enhancing the appearance of the lens unit and providing a desirable cosmetic effect to the lens. In addition, the coating 36 will reduce the fragile appearance of the junction 16.2 and will provide at least a limited degree of protection for said junction for preventing flaking or chipping thereof.

Although the process for preparing a lens unit according to this invention has been described above with application to a bifocal lens unit, it will be understood that trifocal lenses and the like could also be prepared according to this invention. For the manufacture of trifocal lenses, a light-absorbing coating would be applied to the shoulder between the reading and intermediate portions of the lens blank before the intermediate portion of the blank is optically finished. Then the second shoulder of the blank would be coated with light-absorbing material after optical finishing of said intermediate lens portion and before optical finishing of the distance portion of the blank as will be understood.

It should also be understood that the bifocal lens blank has been described by way of illustration and that this invention includes all modifications and equivalents of the described lens unit and method of lens manufacture which fall within the scope of the appended claims.

Having described our invention, we claim:

1. A method of making an ophthalmic lens unit of the character described, said method comprising the steps of providing a lens blank having a side which is divided into at least two portions of different surface curvature and having a shoulder surface extending between said portions, the surface curvature of at least one of said portions being optically finished, masking said optically finished surface curvature at least adjacent to said shoulder surface, treating said shoulder surface to adapt same for substantially reduced light transmission therethrough and removing said mask from said finished surface portion.

2. A method of making an ophthalmic lens unit of the character described, said method comprising the steps of providing a lens blank having a side surface which is divided into at least two surface portions of different surface curvature and having a shoulder extending between said surface portions, the surface portion of shorter radius of curvature being optically finished, masking substantially all of said finished surface portion other than a narrow strip thereof of selected width extending along said shoulder, blasting said shoulder and said unmasked strip of the finished lens surface portion with abrasive material for forming a uniform, finely ground finish thereon, removing said mask from said finished surface portion, and optically finishing the other of said lens surface portions.

3. A method of making an ophthalmic lens unit of the character described, said method comprising the steps of providing a lens blank having a side surface which is divided into at least two surface portions of different surface curvature and having a shoulder extending between said surface portions, the surface portion of shorter radius of curvature being optically finished, masking said finished surface portion, applying a coating of light-absorbing material to said shoulder, removing said mask from said finished surface portion, and optically finishing the other of said surface portions.

4. A method of making an ophthalmic lens unit of the character described, said method comprising the steps of providing a lens blank having a lens surface which is divided into at least two surface portions of different surface curvature and having a shoulder extending between said surface portions, the lens surface portion of shorter radius of curvature being optically finished, masking substantially all of said finished surface portion other than a narrow strip thereof of selected width extending along said shoulder, blasting said shoulder and said unmasked strip of the finished lens surface portion with abrasive material for forming a uniform, finely ground finish thereon, applying a coating of light-absorbing material to said shoulder and said strip of the finished lens surface portion, removing said mask from said finished surface portion, and optically finishing the other of said lens surface portions.

5. A method of making an ophthalmic lens unit of the character described, said method comprising the steps of providing a lens blank having a lens surface which is divided into at least two surface portions of different surface curvature and which has a shoulder extending in a straight line transversely across said lens surface between said portions, the lens surface portion of shorter radius of curvature being optically finished and being joined to said shoulder by a relatively narrow fillet, applying a masking material to substantially all of said finished surface portion other than a narrow strip thereof extending along said shoulder, said strip being of selected width to include at least said narrow fillet, blasting said shoulder and said unmasked strip with abrasive material for forming a uniform, finely ground finish thereon, cleaning said shoulder and said strip, applying a coating of fusable, light-absorbing material to said shoulder and said strip, removing said masking material from said lens surface portion, heating said lens blank for fusing said coating thereto, and optically finishing the other of said lens surface portions.

References Cited
UNITED STATES PATENTS

| | | | |
|---|---|---|---|
| 1,951,506 | 3/1934 | Duckwall | 351—168 |
| 2,216,182 | 10/1940 | Boeder et al. | 351—170 |
| 2,299,405 | 10/1942 | Prange | 51—310 X |
| 2,847,804 | 8/1958 | Calkins et al. | 351—177 X |
| 2,963,823 | 12/1960 | Ohliger | 351—177 X |
| 2,966,767 | 1/1961 | Kress | 51—284 |

LESTER M. SWINGLE, *Primary Examiner.*